W. ADRIANCE.
DEVICES FOR TRANSMITTING MOTION.

No. 194,211.          Patented Aug. 14, 1877.

Witnesses.
Otto Hufeland.
Chas. Wahlers.

Inventor.
Walter Adriance
by
Van Santvoord & Hauff
his attorneys

UNITED STATES PATENT OFFICE.

WALTER ADRIANCE, OF POUGHKEEPSIE, NEW YORK.

IMPROVEMENT IN DEVICES FOR TRANSMITTING MOTION.

Specification forming part of Letters Patent No. 194,211, dated August 14, 1877; application filed July 25, 1877.

*To all whom it may concern:*

Be it known that I, WALTER ADRIANCE, of Poughkeepsie, county of Dutchess and State of New York, have invented a new and Improved Device for Transmitting Motion, which invention is fully set forth in the following specification, reference being had to the accompanying drawings, in which—

Figure 1:
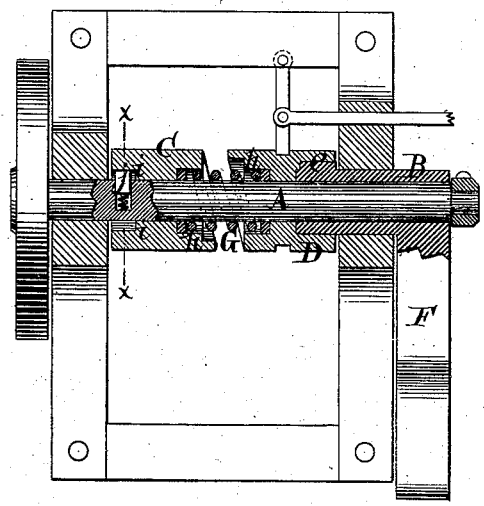
Figure 2:
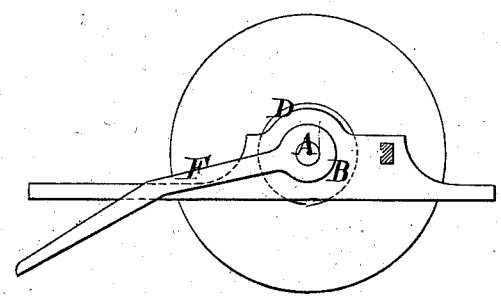
Figure 3:

Figure 1 represents a horizontal section of my device. Fig. 2 is a side elevation thereof. Fig. 3 is a cross-section in the line $xx$, Fig. 1.

Similar letters indicate corresponding parts.

This invention consist in the combination, with a driving-shaft, of a stationary clutch or clutch-head, a sliding clutch, and a sleeve or tubular shaft, to which motion is transmitted, and which is bored out to form the bearing for one end of the driving-shaft, the sliding clutch being feathered on said sleeve so that the driving-shaft is supported at both ends, and its proper relation to the sleeve or tubular shaft is not liable to be disturbed, while at the same time, by throwing the sliding clutch in gear with the clutch-head, the motion of the driving-shaft is transmitted to the tubular shaft or sleeve.

The clutch-head is connected to the driving-shaft by a pawl and ratchet-teeth, so that the transmission of motion to the tubular shaft is only possible when the driving-shaft revolves in one direction.

In the drawing, the letter A designates a shaft, from which motion is to be transmitted to a sleeve, B, and which may receive its motion from a wheel traveling on the ground, a steam-engine, or from any other source. On this driving-shaft are mounted two clutches, C D, the clutch C being stationary, while the clutch D is fitted loosely on said shaft, so that it is adapted to be slid toward and from said stationary clutch, and thus be thrown in or out of gear therewith.

The sleeve B is fitted on the driving-shaft A, and also fitted in a recess formed in the sliding clutch D for its reception, the sleeve being, moreover, connected to said clutch by a feather-key, $e$, so as to turn therewith. Said sleeve B carries an arm, F, which may form a part of a wheel or a pulley, or constitute a crank-arm, as the case may be.

By throwing the sliding clutch D in gear with the stationary clutch C, and at the same time imparting a revolving motion to the driving-shaft A, a like motion is transmitted to the sleeve B through the sliding clutch.

Between the clutches C D is interposed a spring, G, formed of a piece of wire which is coiled on the shaft A, said clutches being each provided with a recess, $h$, for the reception of the ends of said spring.

By the spring G the clutches C D are automatically held apart from each other or out of gear, while at the same time they can readily be thrown in gear against the action of said spring when it is desirable.

In the interior of the stationary clutch are formed a series of ratchet-teeth, $i$, and in the driving-shaft A is formed a socket adapted to receive a spring-pawl, $j$, which engages with said ratchet-teeth. When the driving-shaft A is revolved in the direction of the arrow indicated in Fig. 3, the stationary clutch C is caused to revolve with it; but if said shaft is revolved in the opposite direction, the pawl $j$ rides over the ratchet-teeth $i$, and the clutch C remains stationary, so that if the sliding clutch D is in gear with said stationary clutch, no motion is given thereto, and hence the parts are not liable to sustain any injury by a reverse motion of the driving-shaft if they are arranged to be turned only in one direction, as described in Letters Patent of the United States granted to me March 20, 1877, No. 188,562.

I disclaim everything shown and described in the above-named Letters Patent.

What I claim as new, and desire to secure by Letters Patent, is—

1. The combination, with a driving-shaft, of a stationary clutch-head, a sliding clutch, and a sleeve to which motion is to be transmitted, and which is bored out to form the bearing for one end of the driving-shaft, the sliding clutch being feathered on said sleeve, and the whole being adapted to operate substantially as described.

2. The combination, with a driving-shaft, a stationary clutch or clutch-head, a sliding clutch, a sleeve to which motion is to be transmitted, and which is bored out to form the bearing for one end of the driving-shaft, of ratchet-teeth formed in the interior of said stationary clutch, and of a spring-pawl fitted in a socket formed in the driving-shaft, and engaging with each ratchet-tooth, substantially as and for the purpose described.

In testimony that I claim the foregoing I have hereunto set my hand and seal this 23d day of July, A. D. 1877.

WALTER ADRIANCE. [L. S.]

Witnesses:
 ROBT. N. PALMER,
 WM. McLEAN.